Dec. 26, 1933.    R. H. ROSENBERG    1,940,885
METHOD OF AND APPARATUS FOR ASSEMBLING UNIVERSAL JOINTS
Filed Feb. 12, 1930
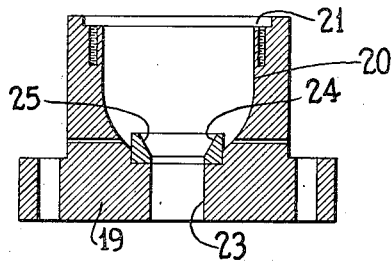
FIG. 1
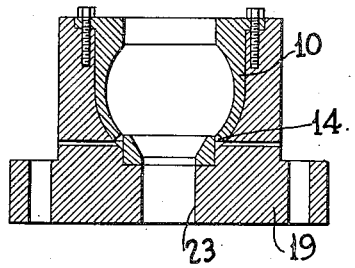
FIG. 2
FIG. 3
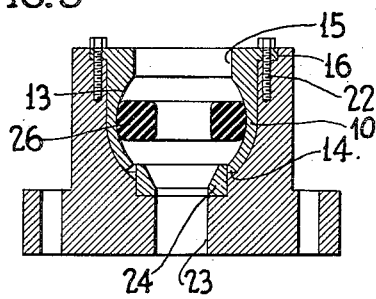
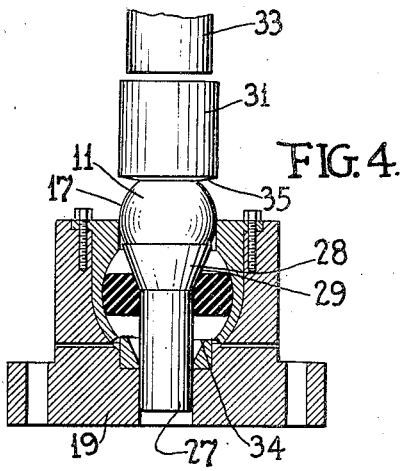
FIG. 4
FIG. 5
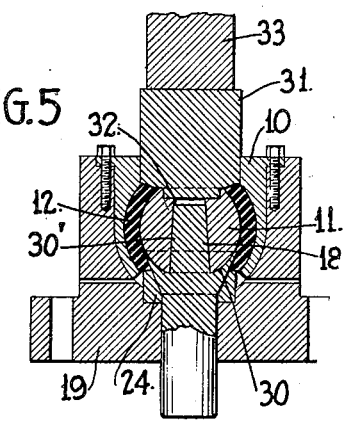
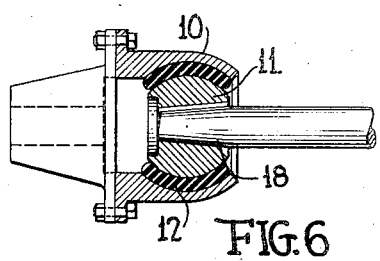
FIG. 6
INVENTOR.
RALPH H. ROSENBERG.
BY
ATTORNEY.

Patented Dec. 26, 1933

1,940,885

UNITED STATES PATENT OFFICE 1,940,885

METHOD OF AND APPARATUS FOR ASSEMBLING UNIVERSAL JOINTS

Ralph H. Rosenberg, Detroit, Mich., assignor to Budd Wheel Company, Philadelphia, Pa., a corporation of Pennsylvania Application February 12, 1930. Serial No. 427,726

1 Claim. (Cl. 29—84)

My invention relates to a method of and apparatus for assembling universal joints comprised of an outer member, an inner member and a distortable member between the inner and outer members adapted to transmit driving torque and permitting relative angular movement between the driving and driven members.

It is an object of my invention to provide a method and apparatus whereby the assembly of such joints may be effected easily and expeditiously. To this end, I have provided an apparatus whereby the parts entering into the joint are properly held and aligned during the assembly operation, so that the distortable element is most readily brought under compression, and evenly expanded into the space between the outer and inner members, by relative axial movement of the said members after the distortable member, such as a live rubber ring, has been first assembled with the outer of said members.

Other and further objects and advantages of the method and apparatus will become apparent from the following detailed description when read in connection with the drawing forming a part hereof.

In the drawing—

Figure 1 shows in central vertical section a base member for holding the outer joint member during the assembling operation.

Figure 2 is a similar view showing the outer joint member in position in the base member.

Figure 3 is a similar view showing the distortable member in the shape of a thick annulus assembled within the outer joint member.

Figure 4 shows the assembly apparatus in the next stage of the assembling operation at the beginning of the expanding action due to the relative axial movement of the outer and inner members.

Figure 5 shows the assembly apparatus in the final position with the parts forced to fully assembled position.

Figure 6 shows the completed joint removed from the assembly apparatus, with a shaft and shaft coupling member associated therewith.

A form of joint conveniently assembled by my method and apparatus may comprise the outer member 10, the inner member 11, and the intermediate distortable member 12 made of rubber or the like. The outer member 10 has an inner spherical surface 13 and an axial opening 14 at one end and a larger axial opening 15 at its opposite end. It is shown in the present instance as being flanged at 16, for securement to a flanged shaft end coupling. The inner member 11 is formed with an outer spherical surface 17 and an axial tapered bore 18 adapted to receive a correspondingly tapered end of a shaft.

The particular structure of these elements for the connection of the shaft ends may of course be widely varied and the particular apparatus employed for assembly may be varied in like respects without departing from the invention.

The base 19 of the apparatus used in the practice of my invention is formed with an axial recess 20 adapted to receive the outer member snugly therein with its flange 16 resting within an annular recess 21 at the upper edge of the seat and it is secured therein by screws 22 extending through openings in the flange and screwing into base 19. A reduced opening 23 extends axially from the bottom of the recess 20 and serves as a guide for a pilot to be described later on. An adapter as 24 extends upwardly into the recess 20 a distance approximately equal to the thickness of the outer member 10, this adapter being formed with an opening in extension of the opening 23, and is formed at the upper portion with a flaring conical seat 25. This adapter is made separate from the base member only for convenience of manufacture.

After the outer member 10 of the joint has been secured in the base member 19 in the manner above described and clearly shown in Figs. 2 and 3, a thick ring 26 of rubber or the like is forced through the enlarged end 15 of the member 10 until it is seated, as shown in Fig. 3, against the greatest diameter of the spherical surface 13 and in axial alignment with member 10. The outer diameter of the ring 26 is such as to permit this assembly without undue compression thereof so that it may, if desired, be effected manually. Particularly is this the case if the outer periphery of the ring is well lubricated before insertion. It will then be readily slipped into the place shown in Fig. 3.

For the further assembly of the joint a center guide or pilot 27 is next inserted through the central opening of the ring 26, which is of a size to receive the cylindrical lower end of the pilot 27 and said pilot has its lower end extended into and guided by the opening 23 of the base member. The head 28 of the pilot 27 is of conical form on its outer surface, as shown at 29 and is formed with a hollow 30 and an extension 30' at the top to receive and center the inner spherical member 11 of the joint. The conical surface 29 of the pilot flows smoothly into the spherical surface of the member 11.

A plug 31 having the outer diameter of its body of a size to enter the opening 15 in the outer member 10 of the joint may be centered and seated on the spherical inner member 11 to hold it accurately aligned with the outer member by having a reduced extension 32 thereof fitting the enlarged recess at the end of the taper bore 18 of the member 11.

When the parts are assembled as shown in Fig. 4, and with the base member seated and secured on the bed of a suitable press, not shown, the ram 33 of the press is made to descend rapidly upon the end of the plug 31, thereby driving the conical surface 29 of the pilot through the central opening of the rubber ring 26 and also the spherical outer surface of the member 11 until the largest diameter of said spherical surface of the member 11 is aligned with the corresponding largest diameter of the spherical surface 13 of the outer member 10. When this takes place, the annular ring will be equally expanded and distorted to fill the space between the spherical surfaces of the outer and inner members 10 and 11 substantially as shown in Fig. 5, and this without any substantial bodily displacement of the ring 26 axially during the relative axial movement of the members 10 and 11, and the parts associated therewith. The differential inclination between the spherical surface 13 and the conical surface 29 on the pilot prevents bodily movement of the ring in assembly. This is further avoided by liberally lubricating the contacting surfaces of ring and pilot surface 29.

When the parts are so assembled, the rubber ring 26 is held under high compression between the members 10 and 11 and forms the driving connection between these members, the completed joint being shown in Fig. 6.

The pilot 27 can readily be removed from the assembly after the operation is completed, as shown in Fig. 5, by a slight distortion of the distortable member 12, to withdraw its head portion 29 from the assembled joint. In the final assembly operation, Fig. 5, the distortable member is positively confined between the end wall 34 of the adapter 24 and the outer periphery portion 35 of the body of the plug 31. No claim is made herein to the joint itself, as this is claimed in a prior copending application filed by me.

While I have herein described my method of assembly in connection with a specific joint structure and as carried out by a specific apparatus, it will be understood that changes and modifications in both method and apparatus, such as would occur to one skilled in the art, may be made without departing from the spirit and scope of the invention as set forth in the annexed claim.

What I claim is:

The method of assembling the elements of a universal joint having a compressible member forming a driving connection between outer and inner members having, respectively, spherical inner and outer surfaces, which consists in supporting the outer member in a base member, with a thick annulus of distortable material snugly inserted in the area of largest diameter of said outer member and substantially axially aligned therewith, inserting a pilot member having a conical surface at one end into said annulus, supporting the inner member on said pilot so that its conical surface merges into the spherical surface of said member, and then relatively axially displacing said outer and inner members to cause the conical surface of the pilot member to be forced through said annulus until the greatest diameter of the spherical surface of the inner member is aligned with the greatest diameter of the spherical surface of the outer member, whereby the distortable member is expanded and placed under compression between the spherical surfaces of said outer and inner members.

RALPH H. ROSENBERG.